United States Patent
Wang et al.

(10) Patent No.: US 11,956,857 B2
(45) Date of Patent: Apr. 9, 2024

(54) METHOD AND SYSTEM FOR ALLOCATING SIM CARD RESOURCE, TERMINAL DEVICE AND STORAGE MEDIUM

(71) Applicant: SHENZHEN UCLOUDLINK NEW TECHNOLOGY CO., LTD., Guangdong (CN)

(72) Inventors: Liang Wang, Guangdong (CN); Enpeng Bai, Guangdong (CN); Zhihui Gong, Guangdong (CN)

(73) Assignee: SHENZHEN UCLOUDLINK NEW TECHNOLOGY CO., LTD., Guangdong (CN)

( * ) Notice: Subject to any disclaimer, the term of this patent is extended or adjusted under 35 U.S.C. 154(b) by 256 days.

(21) Appl. No.: 17/372,812

(22) Filed: Jul. 12, 2021

(65) Prior Publication Data

US 2021/0345092 A1 Nov. 4, 2021

Related U.S. Application Data

(63) Continuation-in-part of application No. PCT/CN2020/102139, filed on Jul. 15, 2020.

(30) Foreign Application Priority Data

Aug. 12, 2019 (CN) .......................... 201910738643..9

(51) Int. Cl.
*H04W 8/20* (2009.01)
*H04W 8/18* (2009.01)
(Continued)

(52) U.S. Cl.
CPC ........... *H04W 8/205* (2013.01); *H04W 8/183* (2013.01); *H04W 12/69* (2021.01); *H04W 48/18* (2013.01)

(58) Field of Classification Search
CPC .......... G06Q 10/0631; G06Q 30/0283; G06Q 30/08; G06Q 50/32; H04L 12/14;
(Continued)

(56) References Cited

U.S. PATENT DOCUMENTS

2007/0004457 A1* 1/2007 Han .................. H04W 8/20
455/558
2014/0370848 A1 12/2014 Petcavich
(Continued)

FOREIGN PATENT DOCUMENTS

| CN | 104219615 A | 12/2014 |
| CN | 104640099 A | 5/2015 |

(Continued)

*Primary Examiner* — Nguyen T Vo
(74) *Attorney, Agent, or Firm* — Robert L. Stearns; Dickinson Wright PLLC

(57) ABSTRACT

The present application relates to the technical field of allocating the SIM resource, and provides a method and a system for allocating a SIM card resource, a terminal device and a storage medium, including acquiring a SIM card resource allocation request of a requesting terminal, and determining candidate SIM card resource sharing information corresponding to the SIM card resource allocation request; determining a target SIM card resource sharing information from the candidate SIM card resource sharing information, and acquiring a target terminal corresponding to the target SIM card resource sharing information; establishing a SIM card resource transmission channel between the target terminal and the requesting terminal; and allocating a SIM card resource corresponding to the target terminal to the requesting terminal through the SIM card resource transmission channel. The present application avoids the waste of SIM card resource by reallocating SIM card resource.

10 Claims, 5 Drawing Sheets

(51) Int. Cl.
*H04W 12/69* (2021.01)
*H04W 48/18* (2009.01)

(58) Field of Classification Search
CPC .......... H04L 12/1457; H04M 15/7652; H04M 17/02; H04M 17/103; H04W 12/35; H04W 12/43; H04W 12/69; H04W 4/24; H04W 4/60; H04W 48/18; H04W 8/183; H04W 8/205
See application file for complete search history.

(56) References Cited

U.S. PATENT DOCUMENTS

| | | |
|---|---|---|
| 2017/0187888 A1 | 6/2017 | Shukla et al. |
| 2018/0077152 A1 | 3/2018 | Lipovkov |
| 2018/0191728 A1 | 7/2018 | Kim et al. |
| 2019/0166521 A1 | 5/2019 | Ali et al. |

FOREIGN PATENT DOCUMENTS

| | | |
|---|---|---|
| CN | 104869558 A | 8/2015 |
| CN | 105530623 A | 4/2016 |
| CN | 107343272 A | 11/2017 |
| CN | 107682831 A | 2/2018 |
| CN | 108600975 A | 9/2018 |
| CN | 109286928 A | 1/2019 |
| CN | 109818759 A | 5/2019 |
| CN | 110493754 A | 11/2019 |
| TR | 201819818 A2 | 2/2019 |
| WO | 2010130988 A1 | 6/2020 |

\* cited by examiner

METHOD AND SYSTEM FOR ALLOCATING SIM CARD RESOURCE, TERMINAL DEVICE AND STORAGE MEDIUM

CROSS-REFERENCE TO RELATED APPLICATION

The present application is a continued-in-part of PCT application Serial No. PCT/CN2020/102139, filed on Jul. 15, 2020 entering US National phase, and claims priority of Chinese patent application with Application NO. 201910738643.9, filed on Aug. 12, 2019, the contents of which is incorporated herein by reference.

BACKGROUND OF THE INVENTION

Technical Field

The present application relates to the technical field of allocating a SIM resource, and more particularly to a method and a system for allocating a SIM card resource, a terminal device and a storage medium.

At present, domestic used are still physical SIM cards. Users can only sign a package contract with one operator. The resources in the SIM card can only be used by the user, and cannot be transmitted or transferred to other users of different operators. The transmission of the SIM card resources of the same operator also depends on the policy of the operator, and the SIM card resources that are not used up at the end of each month will be deducted.

Moreover, at present, the frequency bands supported by different domestic operators are different, and the areas covered by network signals are also different. It may be that the signal of the China Mobile at a certain place is poor but the signal of the Telecom is good. The user cannot switch the Operator network to the Operator network with a good signal when the network signal is not good, and the user experience is poor.

Technical Problem

In view of this, embodiments of the present application provide a method and a system for allocating a SIM (Subscriber Identity Module) card resource, a terminal device, and a storage medium to solve the problem of inconvenience in the transmission and transferring of SIM resources in the prior art.

BRIEF SUMMARY OF THE INVENTION

In a first aspect of an embodiment of the present application, a method for allocating a SIM card resource is provided, which includes:

acquiring a SIM card resource allocation request of a requesting terminal, and determining candidate SIM card resource sharing information corresponding to the SIM card resource allocation request;

determining a target SIM card resource sharing information from the candidate SIM card resource sharing information, and acquiring a target terminal corresponding to the target SIM card resource sharing information;

establishing a SIM card resource transmission channel between the target terminal and the requesting terminal; and allocating a SIM card resource corresponding to the target terminal to the requesting terminal through the SIM card resource transmission channel.

In an embodiment, the acquiring a SIM card resource allocation request of a requesting terminal includes:

acquiring registration information or login information of the requesting terminal;

performing a identity verification on the requesting terminal according to the registration information or the login information; and acquiring the SIM card resource allocation request of the requesting terminal if the identity verification of the requesting terminal is passed.

In an embodiment, before determining candidate SIM card resource sharing information according to the SIM card resource allocation request includes:

acquiring a SIM card resource sharing request of a providing terminal, and acquiring preset SIM card resource sharing information corresponding to the providing terminal according to the SIM card resource sharing request;

correspondingly, the determining the candidate SIM card resource sharing information corresponding to the SIM card resource allocation request includes:

acquiring evaluation information of the SIM card resource corresponding to each of the preset SIM card resource sharing information; and acquiring candidate SIM card resource sharing information corresponding to the SIM card resource allocation request from the preset SIM card resource sharing information according to the evaluation information of the SIM card resource.

In an embodiment, after allocating a SIM card resource corresponding to the target terminal to the requesting terminal through the SIM card resource transmission channel includes:

acquiring usage evaluation information of the SIM card resource allocated by the requesting terminal to the target terminal; and updating the evaluation information of the SIM card resource allocated by the target terminal according to the usage evaluation information.

In an embodiment, the determining candidate SIM card resource sharing information corresponding to the SIM card resource allocation request includes:

acquiring search keywords corresponding to the SIM card resource allocation request; and searching for candidate SIM card resource sharing information corresponding to the SIM card resource allocation request according to the search keywords;

correspondingly, the determining the target SIM card resource sharing information from the candidate SIM card resource sharing information includes:

sorting searched candidate SIM card resource sharing information according to a preset sorting manner;

sending sorted candidate SIM card resource sharing information to the requesting terminal to instruct the requesting terminal to select target SIM card resource sharing information from the candidate SIM card resource sharing information; and receiving the target SIM card resource sharing information selected by the requesting terminal.

In an embodiment, after allocating a SIM card resource corresponding to the target terminal to the requesting terminal through the SIM card resource transmission channel includes:

acquiring a current usage status of the SIM card resource; and disconnecting the SIM card resource transmission channel if the current use state meets a preset condition.

In a second aspect of the present application, a terminal device is provided, which includes: a memory, a processor, and a computer program stored in the memory and capable of running on the processor; the processor executes the computer program implementing steps of the method for allocating a SIM card resource according to the first aspect.

In an embodiment, the computer program includes:

a first acquiring module, configured for acquiring a SIM card resource allocation request of a requesting terminal, and determining candidate SIM card resource sharing information corresponding to the SIM card resource allocation request;

a second acquiring module, configured for determining a target SIM card resource sharing information from the candidate SIM card resource sharing information, and acquiring a target terminal corresponding to the target SIM card resource sharing information;

a connection module, configured for establishing a SIM card resource transmission channel between the target terminal and the requesting terminal; and a transmission module, configured for allocating a SIM card resource corresponding to the target terminal to the requesting terminal through the SIM card resource transmission channel.

In an embodiment, the first acquiring module includes:

a first acquiring unit, configured for acquiring registration information or login information of the requesting terminal;

a verification unit, configured for performing a identity verification on the requesting terminal according to the registration information or the login information; and a second acquiring unit, configured for acquiring the SIM card resource allocation request of the requesting terminal after the identity verification of the requesting terminal is passed.

In a third aspect of the present application, a computer readable storage medium storing a computer program is provided, and the computer program is executed by a processor to implement steps of the method for allocating a SIM card resource according to the first aspect.

BENEFICIAL EFFECT

The beneficial effects of the embodiments of the present application are:

The embodiments of the present application provide a method and a system for allocating a SIM card resource, a terminal device and a storage medium. The transferring of SIM card resources is realized by allocating the SIM card resources shared by the target terminal to the requesting terminal in need, specifically, a resource transmission channel is established between the requesting terminal and the providing terminal for resource transmission, thereby reallocating the SIM card resource, avoiding waste of the SIM card resource, and at the same time improving user experience through the reallocation of SIM card resource.

THE DRAWINGS

In order to explain the embodiments of the present invention more clearly, a brief introduction regarding the accompanying drawings that need to be used for describing the embodiments of the present invention or the prior art is given below; it is obvious that the accompanying drawings described as follows are only some embodiments of the present invention, for those skilled in the art, other drawings can also be obtained according to the current drawings on the premise of paying no creative labor.

DETAILED DESCRIPTION OF EMBODIMENTS OF THE INVENTION

In order to enable those skilled in the art to better understand the solutions of the present application, the technical solutions in the embodiments of the present application will be clearly described below in conjunction with the accompanying drawings in the embodiments of the present application. Obviously, the described embodiments are a part of the embodiment, not all embodiments of the present application. Based on the embodiments of the present application, all other embodiments obtained by those of ordinary skill in the art without creative work shall fall within the protection scope of the present application.

The term "comprising" in the specification and claims of the present application and the above-mentioned drawings and any variations thereof are intended to cover non-exclusive inclusions. For example, a process, method, system, product, or device that includes a series of steps or units is not limited to the listed steps or units, but optionally includes unlisted steps or units, or optionally also includes other steps or units inherent in the process, method, product or device. In addition, the terms "first", "second" and "third" are used to distinguish different objects, rather than to describe a specific order.

Embodiment 1

Figure 1:
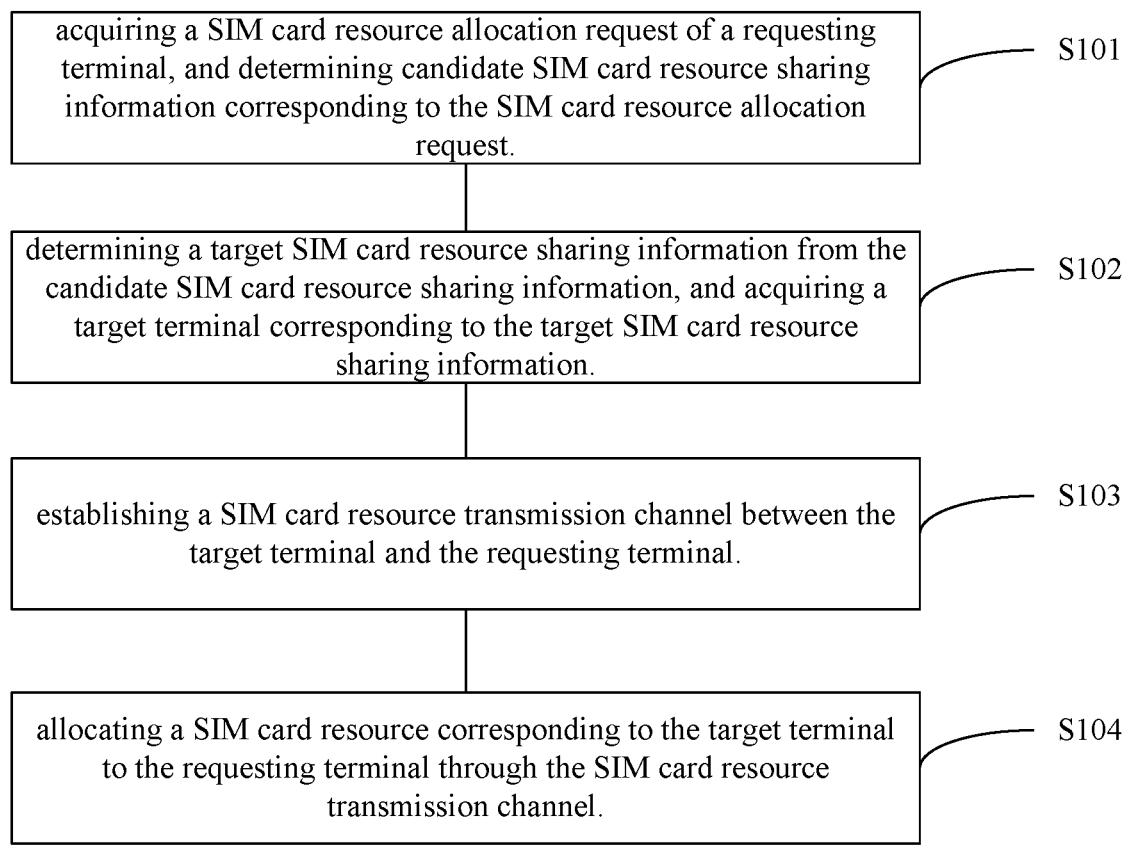
FIG. 1 is a schematic flowchart of a method for allocating a SIM card resource provided by an embodiment of the present application.

As shown in FIG. 1, the method for allocating a SIM card resource provided by the embodiment includes:

S101: acquiring a SIM card resource allocation request of a requesting terminal, and determining candidate SIM card resource sharing information corresponding to the SIM card resource allocation request.

In the present application, the SIM card resource can include SMS messages, call duration, traffic, call charges, and can also include the modem corresponding to the SIM card.

The present application mainly allocates excess SIM card resource of some user to users in need, so as to reallocate the SIM card resource. In order to finish this, the users need to provide sharing or requesting information for targeted SIM card resource allocation. Specifically, first, the sharing terminal (that is the providing terminal) issues the SIM card resource sharing information on the system for allocating the SIM card resource. The SIM card resource sharing information can include the shareable call duration, the number of SMS messages, and traffic, for example, it may be a 60 minutes call duration, 120 SMS messages, 3 GB traffic; the providing terminal can also price the provided SIM card resource to obtain certain compensation. The pricing can be determined by the user corresponding to the providing terminal, and the system for allocating the SIM card resource can also provide recommended prices for users as reference to pricing, the recommended prices can be determined based on the same type of SIM card resource and external market prices calculated by the system for allocating the SIM card resource. For example, the market price of 1 GB telecom traffic is 3 yuan, and the average price of the system for allocating the SIM card resource is 2 yuan, the system for allocating the SIM card resource can recommend the price to users between 1.5-2.5 yuan, preferably 2 yuan; among them, the system for allocating the SIM card resource can use tokens as the transaction currency, and the tokens and the real currencies can be exchanged according to a certain ratio.

The above-mentioned reallocation of SIM card resource using the token transaction method is only one of the allocation methods of the SIM card resource allocation. In the embodiment, the SIM card resources can also be allocated through the SIM card resource exchanging method. For example, if the SIM card of user A has excess call duration, but the traffic is insufficient, the user A can use his excess call duration to exchange the traffic with other users; specifically, user A can send his exchange request to the system for allocating the SIM card resource for other users to consult. If user B sees the exchange request, and the user B just needs the call duration and has excess traffic, the user B can send request to the user A to exchange SIM card resource with user A through the system for allocating the SIM card resource, the user A can decide whether to exchange with the user B according to the request. If the user A agrees to exchange with the user B, the system for allocating the SIM card resource can establish a SIM card resource transmission channel between the terminal corresponding to user A and the terminal corresponding to user B, to allocate the call duration of user A and the traffic of user B through the SIM card resource transmission channel. Of course, the exchanging of the SIM card resource can also exchange the same type of resources, for example, the traffic of the Unicom can be used to exchange the traffic of the Telecom. When the amount of SIM card resource required by user B is lower or higher than the amount of SIM card resource in the exchange request issued by the user A, the user A can be negotiated to adjust the amount of SIM card resources exchanged, when the user B cannot contact the user A, the user B can leave a message and wait for the user A to contact the user B.

Here, since the resource sharing or allocation is carried out through the system for allocating the SIM card resource, where the system for allocating the SIM card resource can be a cloud server, the user needs to register and verify the identity on the system for allocating the SIM card resource in order to establish a connection between the terminal corresponding to the user and the cloud server, where the identity verification includes ID verification and name verification. At the same time, users who want to share SIM card resource also need to bind their corresponding SIM card to the cloud server. During the binding process, the cloud server can detect whether the identity information corresponding to the mobile phone number in the SIM card that requests the binding is the same as the identity information registered by the user, if the identity information corresponding to the mobile phone number in the SIM card is the same as the identity information registered by the user, it can be determined that the SIM card binding is successful. After the SIM card is successfully bound, the cloud server can detect the remaining resources in the bound SIM card and display the detected remaining resources on the corresponding personal page of the user. At the same time, the cloud server can also update the remaining resources in the SIM in real time enable the user to know the remaining status of the SIM resource at any time, so as to prevent the user from issuing wrong resource sharing information due to inaccurate understanding of the remaining resources in the SIM card.

During the application, users who need SIM card resource need to search for SIM card resource to find the SIM card resource sharing information they need. The preliminary search can use keywords search, and further screening conditions can be added, such as search keyword is "traffic", which further restricts the operator to Telecom and the price is within 3 yuan/GB.

The SIM card resource sharing information searched through the above steps can be sorted according to preset rules. For example, the SIM card resource sharing information can be sorted according to the SIM card resource issued time. Users can also change the sorting method and use their own specified method to sort. Sorting search results through preset rules or user-specified rules can make it easier for users to find the optimal choice. For example, sorting the search results from low to high helps users find the best price option.

S102: determining a target SIM card resource sharing information from the candidate SIM card resource sharing information, and acquiring a target terminal corresponding to the target SIM card resource sharing information.

During the application, when a user has a demand for SIM card resource but is not urgently needed, he can display his SIM card resource allocation request on the system for allocating the SIM card resource, and wait for other users to leave the SIM card resource sharing information targeted.

If there are too many SIM card resource sharing information left, you can change the sorting method of the information to select the SIM card resource sharing information that best meets your requirements. For example, the requesting terminal issues a 5 GB traffic allocation request and receives up to 50 pieces of SIM card resource sharing information, you can sort the SIM card resource sharing information according to the price from low to high, and select the lowest price SIM card resource sharing information; or sort the SIM card resource sharing information according to quality score of the SIM card resource from high to low, to select the SIM card resource sharing information with the highest SIM card resource quality score; or sort the SIM card resource sharing information according to the comprehensive evaluation of various aspects, where the comprehensive evaluation can be an evaluation based on comprehensive price, quality, and issued time.

If a user wants to share SIM card resource with other users, he can also send a sharing request to the cloud server, and the cloud server will send the sharing request to the designated user, and wait for the terminal corresponding to the designated user to be authorized to share the SIM card resource; there are two specific situations, one situation is that user A can share his SIM card resource with designated user B, and the other is that user A requests designated user B to share SIM resource with the user A.

The mobile phone now has a personal hotspot function for sharing traffic, but it must be within the coverage of the mobile hotspot, and traffic cannot be shared in locations that are not covered by the mobile hotspot. The aforementioned SIM card resource sharing can realize remote SIM card resource sharing, and is especially suitable for directional sharing between family members and friends.

After the user authorizes the partial sharing of SIM card resource on the system for allocating the SIM card resource, when other users select the SIM card resource, they can choose to allocate only part of the SIM card resources. For example, the user A shares 1 GB traffic, and other user B who has traffic needs can request the allocation of 0-1 GB traffic, and the specific allocation value can be adjusted by himself.

After the user selects the SIM card resource he wants or reaches an exchange agreement, the system for allocating the SIM card resource can determine the target terminal selected by the user, and can send an allocation authorization request to the target terminal, and the user corresponding to the target terminal can follow the allocation authorization request determines whether to approve the allocation, and feeds back the corresponding response result to the system for allocating the SIM card resource. The system for allocating the SIM card resource will only perform SIM card resource transmission after receiving the response result that the user agrees to the allocation.

In an embodiment, before S102, the method further includes:

acquiring a SIM card resource sharing request of a providing terminal, and acquiring preset SIM card resource sharing information corresponding to the providing terminal according to the SIM card resource sharing request.

During the application, the providing terminal first sets the SIM card resource information to be issued, and then the SIM card resource information is submitted to the system for allocating the SIM card resource. After the system is approved, the SIM card resource information set by the providing terminal is acquired and issued.

correspondingly, the determining the candidate SIM card resource sharing information corresponding to the SIM card resource allocation request includes:

acquiring evaluation information of the SIM card resource corresponding to each of the preset SIM card resource sharing information.

The evaluation information of the SIM card resource may include quality evaluation and service evaluation of the SIM card resource.

acquiring candidate SIM card resource sharing information corresponding to the SIM card resource allocation request from the preset SIM card resource sharing information according to the evaluation information of the SIM card resource.

During the application, the SIM card resource allocation request may have requirements for the quality of SIM card resource and the quality of service provided by the terminal, and the acquired SIM card resource sharing information needs to be screened based on this requirement to select candidates SIM card resource sharing information that meet the requirements.

The user can also acquire the required resources from the resource providing terminal recommended by the system for allocating the SIM card resource. The recommended resource providing terminal is a high-quality terminal selected by the system according to various evaluations. There are two specific methods, one is evaluation ranking, terminals ranked within the preset ranking will be qualified for recommendation; the other is to set a minimum evaluation standard, and terminals with evaluations higher than the minimum standard will be qualified for recommendation; the specific evaluation can be a certain aspect of evaluation, such as the quality of the card, it can also be a comprehensive evaluation acquired from at least two aspects of evaluation.

S103: establishing a SIM card resource transmission channel between the target terminal and the requesting terminal.

During the application, the SIM card resource transmission channel can be a one-way channel or a duplex channel. Of course, the channel here is just a metaphor, and SIM resources are mainly transmitted through wireless signals.

S104: allocating a SIM card resource corresponding to the target terminal to the requesting terminal through the SIM card resource transmission channel.

Figure 2:
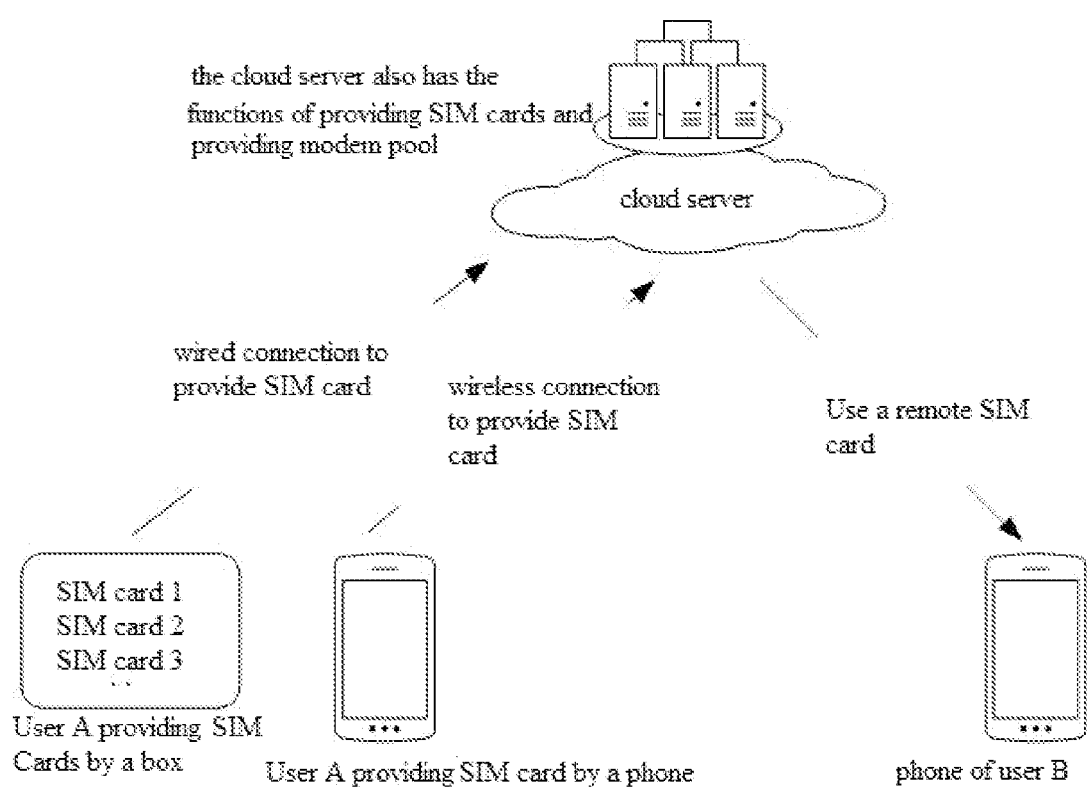
FIG. 2 is a schematic diagram of interaction of a method for allocating a SIM card resource provided by an embodiment of the present application.

As shown in FIG. 2, in the application scenario where the system for allocating the SIM card resource is a cloud server, if the requesting terminal B does not have a modem device, you can use App or Web to establish a connection with the cloud server to enjoy the SIM card call duration or SMS message service. At this time, the SIM card call duration or SMS message purchased by the user B is on standby in the cloud modem pool or the modem or mobile phone shared by user A, and then the voice data of the SIM card and the SMS message data of the SIM card are transmitted to the App or Web terminal of user B through the internet.

In an embodiment, after S104, the method may further include:

acquiring usage evaluation information of the SIM card resource allocated by the requesting terminal to the target terminal.

The usage evaluation information includes the scoring of the quality of the resource and the description of the resource.

updating the evaluation information of the SIM card resource allocated by the target terminal according to the usage evaluation information.

Here, the evaluation information of the SIM card resource is acquired by synthesizing all the usage evaluation information of the SIM card resource. Assume that two users score a SIM card resource, the first user scores 8 points, and the second one scores 6 points, then the synthesized SIM card resource score is (6+8)/2=7 points.

In an embodiment, after S104, the method further includes:

acquiring a current usage status of the SIM card resource.

disconnecting the SIM card resource transmission channel if the current use state meets a preset condition.

During the application, the above-mentioned preset condition includes a variety of situations. The first situation is that the requesting terminal uses up the allocated SIM card resource; the second situation is that the use time of the SIM card resource has reached a limited time; the third situation is that users reach an agreement to end resource transmission early; and the fourth situation is that the requesting terminal or the providing terminal unilaterally apply to end resource transmission.

If the requesting terminal finds that the allocated resources cannot be used up before the limited time, or the resources are no longer needed, it can issue a transferring request on the system for allocating the SIM card resource to transfer the remaining resources to other users in need.

Figure 3:
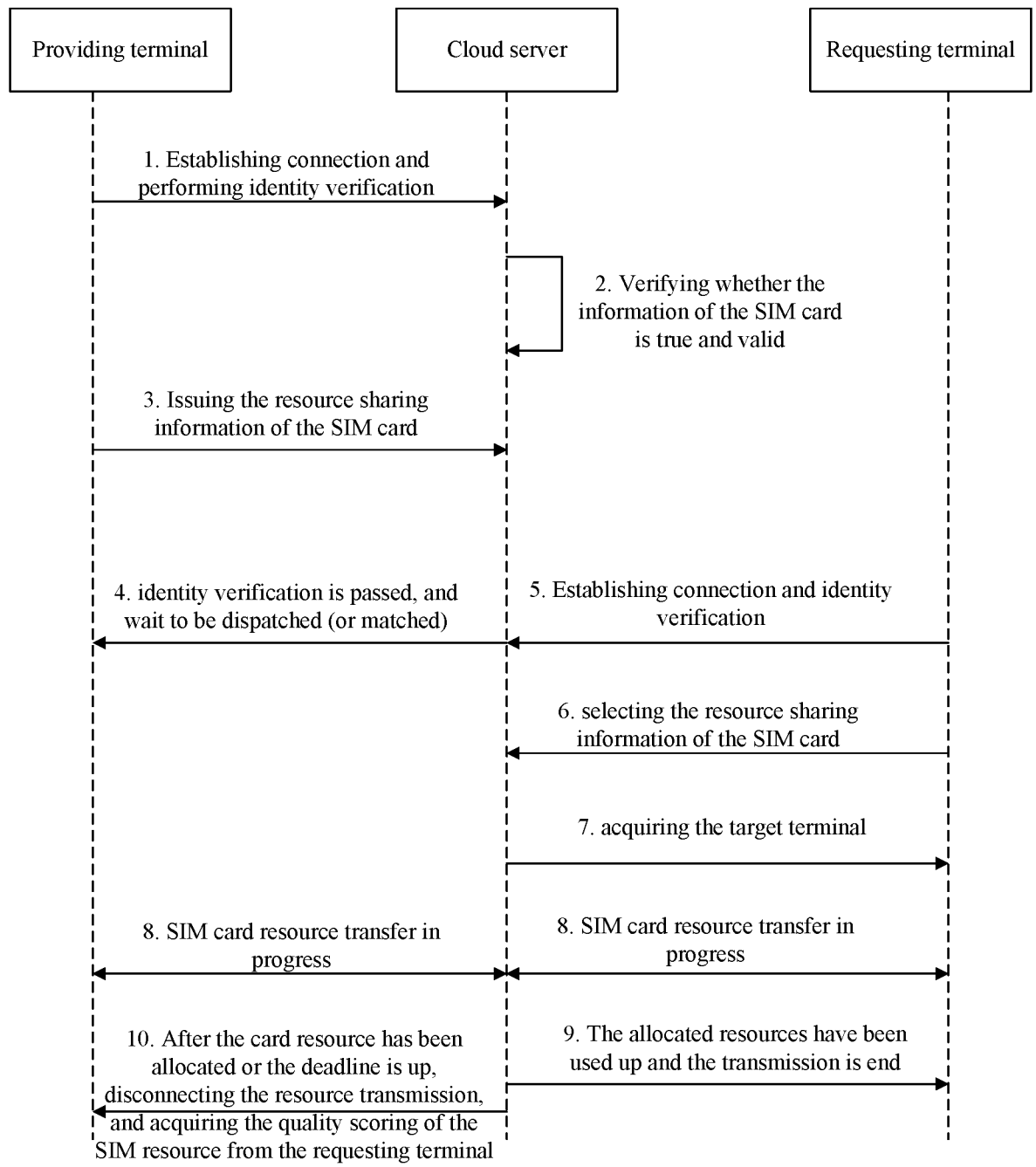
FIG. 3 is a schematic flowchart of a method for allocating a SIM card resource in an application scenario provided by an embodiment of the present application.

As shown in FIG. 3, in a specific application scenario, the system for allocating the SIM card resource may be a cloud server. In this scenario, the specific SIM card resource allocation process may be as follows:

a first step, receiving the registration request of the providing terminal and performing identity verification on the providing terminal;

a second step, after the identity verification is passed, the registration of the providing terminal is successful, and checking whether the identity information corresponding to the SIM card bound to the providing terminal matches the identity information in the registration information, that is, whether the SIM card is true and valid;

a third step, after confirming that the SIM card that is requested to be bound by the providing terminal is true and valid, receiving the resource sharing information of the SIM card of the providing terminal;

a fourth step, detecting whether the SIM card resource shared in the SIM card resource sharing information issued by the providing terminal is less than the SIM card resource in the SIM card bound to the providing terminal. If the SIM card resource shared in the SIM card resource sharing information issued by the providing terminal is less than the SIM card resource in the SIM card bound to the providing terminal, it is determined that the SIM card resource sharing information is successfully issued;

a fifth step, receiving the registration request of the requesting terminal, and performing identity verification on the requesting terminal;

a sixth step, if the identity verification of the requesting terminal is passed, receiving the SIM card sharing resource information selected by the requesting terminal;

a seventh step, acquiring the target terminal corresponding to the SIM card sharing resource information selected by the requesting terminal, wherein the target terminal is one of the providing terminals;

a eighth step, establishing the resource transmission channel between the requesting terminal and the providing terminal to transmit SIM card resources;

a ninth step, disconnecting the SIM card resource transmission channel after the current use state meets the preset condition for ending resource transmission;

a tenth step, acquiring the usage evaluation information of the SIM card resource allocated by the providing terminal by the requesting terminal, and updating the evaluation information of the SIM card resource allocated by the providing terminal according to the usage evaluation information.

The embodiment of the present application provides the method for allocating the SIM card resource. The transferring of SIM card resources is realized by allocating the SIM card resources shared by the target terminal to the requesting terminal in need, specifically, a resource transmission channel is established between the requesting terminal and the providing terminal for resource transmission, thereby reallocating the SIM card resource, avoiding waste of the SIM card resource, and at the same time improving user experience through the reallocation of SIM card resource.

It should be understood that the size of the sequence number of each step in the foregoing embodiment does not mean the order of execution. The execution sequence of each process should be determined by its function and internal logic, and should not constitute any limitation on the implementation process of the embodiment of the present application.

Embodiment 2

Figure 4:
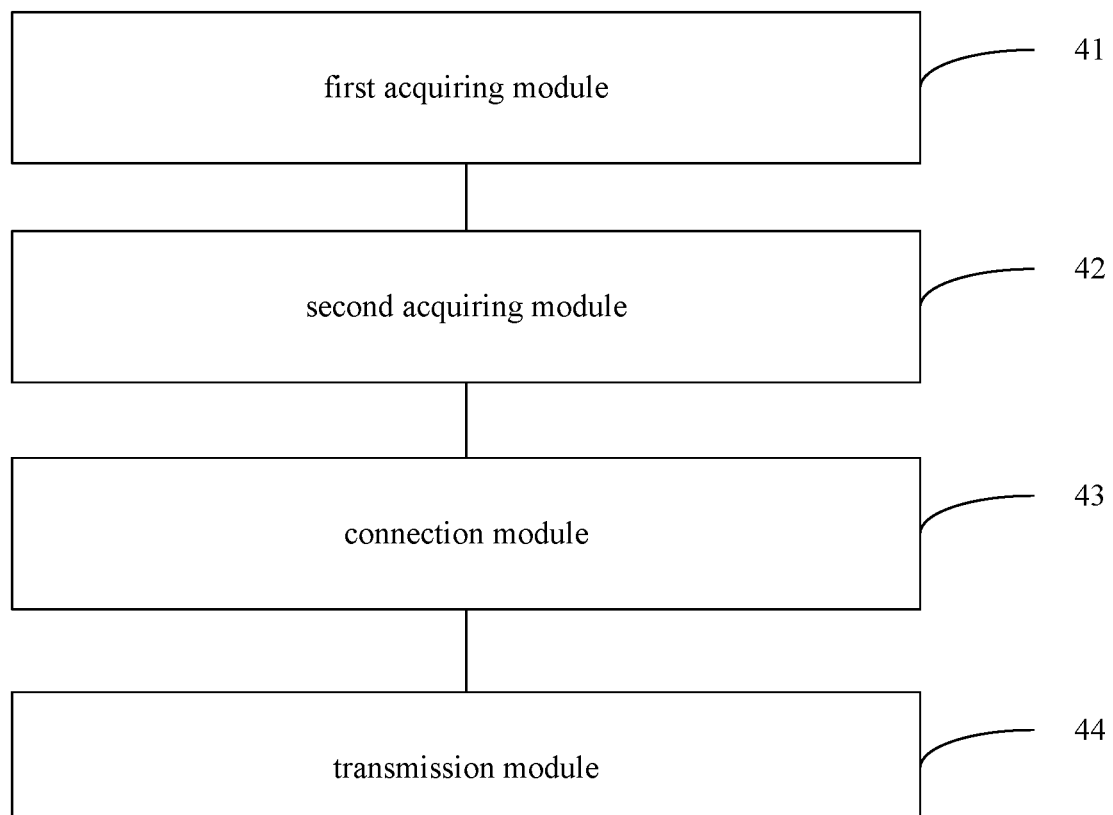
FIG. 4 is a schematic diagram of a system for allocating a SIM card resource provided by an embodiment of the present application.

Please refer to FIG. 4, the embodiment of the present application provides a system for allocating the SIM card resource, configured for executing the method steps of embodiment 1, the system for allocating the SIM card resource includes: the first acquiring module 41, the second acquiring module 42, the connection module 43 and the transmission module 44.

the first acquiring module 41, configured for acquiring a SIM card resource allocation request of a requesting terminal, and determining candidate SIM card resource sharing information corresponding to the SIM card resource allocation request;

the second acquiring module 42, configured for determining a target SIM card resource sharing information from the candidate SIM card resource sharing information, and acquiring a target terminal corresponding to the target SIM card resource sharing information;

the connection module 43, configured for establishing a SIM card resource transmission channel between the target terminal and the requesting terminal; and the transmission module 44, configured for allocating a SIM card resource corresponding to the target terminal to the requesting terminal through the SIM card resource transmission channel.

In an embodiment, the first acquiring module 41 includes:

the first acquiring unit configured for acquiring registration information or login information of the requesting terminal;

the verification unit, configured for performing a identity verification on the requesting terminal according to the registration information or the login information; and the second acquiring unit, configured for acquiring the IM card resource allocation request of the requesting terminal after the identity verification of the requesting terminal is passed.

In an embodiment, the system for allocating the SIM card resource further includes:

a third acquiring module, configured for acquiring a SIM card resource sharing request of a providing terminal, and acquiring preset SIM card resource sharing information corresponding to the providing terminal according to the SIM card resource sharing request;

optionally, the first acquiring module 41 further includes:

a third acquiring unit, configured for acquiring evaluation information of the SIM card resource corresponding to each of the preset SIM card resource sharing information; and an evaluation unit, configured for acquiring candidate SIM card resource sharing information corresponding to the SIM card resource allocation request from the preset SIM card resource sharing information according to the evaluation information of the SIM card resource.

In an embodiment, the system for allocating the SIM card resource further includes:

a fourth acquiring module, configured for acquiring usage evaluation information of the SIM card resource allocated by the requesting terminal to the target terminal; and an evaluation module, configured for updating the evaluation information of the SIM card resource allocated by the target terminal according to the usage evaluation information.

Preferably, the first acquiring module 41 includes:

a fourth acquiring unit, configured for acquiring search keywords corresponding to the SIM card resource allocation request; and a searching unit, configured for searching for candidate SIM card resource sharing information corresponding to the SIM card resource allocation request according to the search keywords.

Further, the second acquiring module 42 includes:

a sorting unit, configured for sorting searched candidate SIM card resource sharing information according to a preset sorting manner;

a transferring unit, configured for sending sorted candidate SIM card resource sharing information to the requesting terminal to instruct the requesting terminal to select target SIM card resource sharing information from the candidate SIM card resource sharing information; and a receiving unit, configured for receiving the target SIM card resource sharing information selected by the requesting terminal.

In an embodiment, the system for allocating the SIM card resource further includes:

a fifth acquiring unit, configured for acquiring a current usage status of the SIM card resource; and a judging unit, configured for disconnecting the SIM card resource transmission channel when the current use state meets a preset condition.

The embodiment of the present application provides the system for allocating the SIM card resource. The transferring of SIM card resources is realized by allocating the SIM card resources shared by the target terminal to the requesting terminal in need, specifically, a resource transmission channel is established between the requesting terminal and the providing terminal for resource transmission, thereby reallocating the SIM card resource, avoiding waste of the SIM card resource, and at the same time improving user experience through the reallocation of SIM card resource.

It should be understood that the size of the sequence number of each step in the foregoing embodiment does not mean the order of execution. The execution sequence of each process should be determined by its function and internal logic, and should not constitute any limitation on the implementation process of the embodiment of the present application.

Embodiment 3

Figure 5:
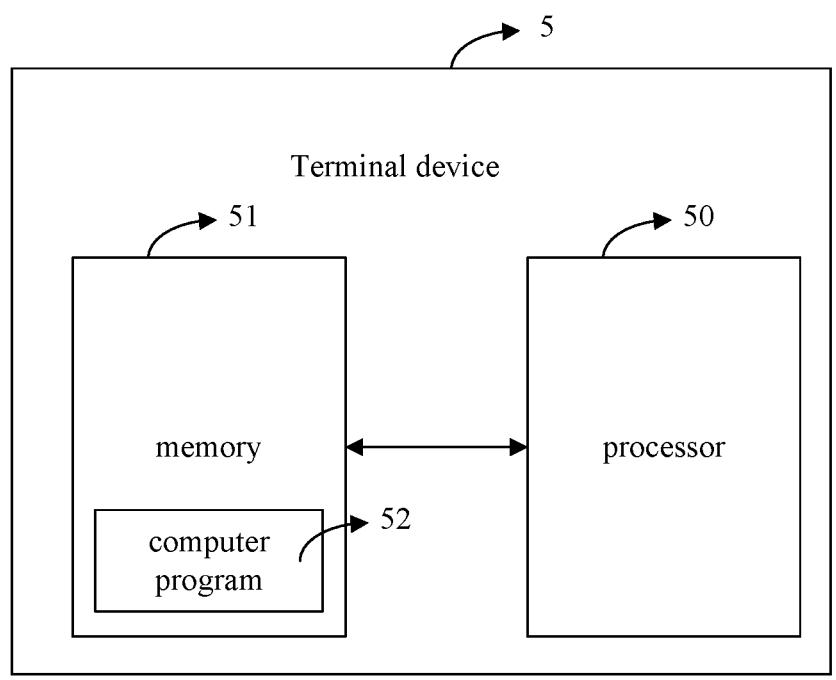
FIG. 5 is a schematic diagram of a terminal device provided by an embodiment of the present application.

As shown in FIG. 5, the terminal device of the embodiment includes: a memory 50, a processor 51, and a computer program 52 stored in the memory 51 and capable of running on the processor 50; such as the identify verification program. The processor 50 executes the computer program 52 implementing steps of the method embodiment for allocating a SIM card resource, such as the steps 101 to 104 shown in FIG. 1. Alternatively, the processor 50 executes the computer program 52 implementing modules/units of above device in the embodiments, such as modules 41 to 44 as shown in FIG. 4.

Exemplarily, the computer program 52 may be divided into one or more modules/units, and the one or more modules/units are stored in the memory 51 and executed by the processor 50 to complete the present application. The one or more modules/units may be a series of computer program instruction segments capable of completing specific functions, and the instruction segments are used to describe the execution process of the computer program 52 in the terminal device 5. For example, the computer program 52 may be divided into a first acquiring module, a second acquiring module, a connection module, and a transmission module. The specific functions of each module are as follows:

the first acquiring module, configured for acquiring a SIM card resource allocation request of a requesting terminal, and determining candidate SIM card resource sharing information corresponding to the SIM card resource allocation request;

the second acquiring module, configured for determining a target SIM card resource sharing information from the candidate SIM card resource sharing information, and acquiring a target terminal corresponding to the target SIM card resource sharing information;

the connection module, configured for establishing a SIM card resource transmission channel between the target terminal and the requesting terminal; and the transmission module, configured for allocating a SIM card resource corresponding to the target terminal to the requesting terminal through the SIM card resource transmission channel.

The terminal device 5 may be a computing device such as a desktop computer, a laptop, a palmtop computer, and a cloud server. The terminal device may include, but is not limited to, a processor 50 and a memory 51. Those skilled in the art can understand that FIG. 5 is only an example of the terminal device 5, and does not constitute a limitation on the terminal device 5. It may include more or less components than shown in the figure, or a combination of certain components, or different components. For example, the terminal device may also include input and output devices, network access devices, buses, and so on.

The so called processor 50 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The memory 51 can be an internal storage unit of the terminal device 5, such as a hard disk or a memory of the terminal device 5. The memory 51 can also be an external memory of the terminal device 5, such as a plug-in hard disk, a SMC (Smart Media Card), a SD (Secure Digital) card, a FC (Flash Card) equipped on the terminal device 5. Further, the memory 51 may include both the internal storage unit and the external storage device of the terminal device 5, either. The memory 51 is configured to store the computer programs, and other procedures and data needed by the terminal device 5 for determining wellbore cross-sectional shape. The memory 51 can also be configured to storing data that has been output or being ready to be output temporarily.

It can be clearly understood by the persons skilled in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

Those skilled in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory) and software distribution medium, etc.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A method for allocating a SIM card resource, comprising:
    acquiring a SIM card resource allocation request of a requesting terminal, and determining candidate SIM card resource sharing information corresponding to the SIM card resource allocation request;
    determining a target SIM card resource sharing information from the candidate SIM card resource sharing information, and acquiring a target terminal corresponding to the target SIM card resource sharing information;
    establishing a SIM card resource transmission channel between the target terminal and the requesting terminal; and
    allocating a SIM card resource corresponding to the target terminal to the requesting terminal through the SIM card resource transmission channel.

2. The method for allocating a SIM card resource according to claim 1, wherein the acquiring a SIM card resource allocation request of a requesting terminal comprises:
    acquiring registration information or login information of the requesting terminal;
    performing a identity verification on the requesting terminal according to the registration information or the login information; and
    acquiring the SIM card resource allocation request of the requesting terminal if the identity verification of the requesting terminal is passed.

3. The method for allocating a SIM card resource according to claim 1, wherein before determining candidate SIM card resource sharing information according to the SIM card resource allocation request comprises:
    acquiring a SIM card resource sharing request of a providing terminal, and acquiring preset SIM card resource sharing information corresponding to the providing terminal according to the SIM card resource sharing request;
    correspondingly, the determining the candidate SIM card resource sharing information corresponding to the SIM card resource allocation request comprises:
    acquiring evaluation information of the SIM card resource corresponding to each of the preset SIM card resource sharing information; and
    acquiring candidate SIM card resource sharing information corresponding to the SIM card resource allocation request from the preset SIM card resource sharing information according to the evaluation information of the SIM card resource.

4. The method for allocating a SIM card resource according to claim 3, wherein after allocating a SIM card resource corresponding to the target terminal to the requesting terminal through the SIM card resource transmission channel comprises:
    acquiring usage evaluation information of the SIM card resource allocated by the requesting terminal to the target terminal; and
    updating the evaluation information of the SIM card resource allocated by the target terminal according to the usage evaluation information.

5. The method for allocating a SIM card resource according to claim 1, wherein the determining candidate SIM card resource sharing information corresponding to the SIM card resource allocation request comprises:
  acquiring search keywords corresponding to the SIM card resource allocation request; and
  searching for candidate SIM card resource sharing information corresponding to the SIM card resource allocation request according to the search keywords;
  correspondingly, the determining the target SIM card resource sharing information from the candidate SIM card resource sharing information comprises:
  sorting searched candidate SIM card resource sharing information according to a preset sorting manner;
  sending sorted candidate SIM card resource sharing information to the requesting terminal to instruct the requesting terminal to select target SIM card resource sharing information from the candidate SIM card resource sharing information; and
  receiving the target SIM card resource sharing information selected by the requesting terminal.

6. The method for allocating a SIM card resource according to claim 1, wherein after allocating a SIM card resource corresponding to the target terminal to the requesting terminal through the SIM card resource transmission channel comprises:
  acquiring a current usage status of the SIM card resource; and
  disconnecting the SIM card resource transmission channel if the current use state meets a preset condition.

7. A terminal device, comprising: a memory, a processor, and a computer program stored in the memory and capable of running on the processor; wherein the processor executes the computer program implementing steps as follows:
  acquiring a SIM card resource allocation request of a requesting terminal, and determining candidate SIM card resource sharing information corresponding to the SIM card resource allocation request;
  determining a target SIM card resource sharing information from the candidate SIM card resource sharing information, and acquiring a target terminal corresponding to the target SIM card resource sharing information;
  establishing a SIM card resource transmission channel between the target terminal and the requesting terminal; and
  allocating a SIM card resource corresponding to the target terminal to the requesting terminal through the SIM card resource transmission channel.

8. The terminal device according to claim 7, wherein the computer program comprises:
  a first acquiring module, configured for acquiring a SIM card resource allocation request of a requesting terminal, and determining candidate SIM card resource sharing information corresponding to the SIM card resource allocation request;
  a second acquiring module, configured for determining a target SIM card resource sharing information from the candidate SIM card resource sharing information, and acquiring a target terminal corresponding to the target SIM card resource sharing information;
  a connection module, configured for establishing a SIM card resource transmission channel between the target terminal and the requesting terminal; and
  a transmission module, configured for allocating a SIM card resource corresponding to the target terminal to the requesting terminal through the SIM card resource transmission channel.

9. The terminal device according to claim 8, wherein the first acquiring module comprises:
  a first acquiring unit, configured for acquiring registration information or login information of the requesting terminal;
  a verification unit, configured for performing a identity verification on the requesting terminal according to the registration information or the login information; and
  a second acquiring unit, configured for acquiring the SIM card resource allocation request of the requesting terminal after the identity verification of the requesting terminal is passed.

10. A non-transitory computer readable storage medium storing a computer program, wherein the computer program is executed by a processor to implement steps as follows:
  acquiring a SIM card resource allocation request of a requesting terminal, and determining candidate SIM card resource sharing information corresponding to the SIM card resource allocation request;
  determining a target SIM card resource sharing information from the candidate SIM card resource sharing information, and acquiring a target terminal corresponding to the target SIM card resource sharing information;
  establishing a SIM card resource transmission channel between the target terminal and the requesting terminal; and
  allocating a SIM card resource corresponding to the target terminal to the requesting terminal through the SIM card resource transmission channel.

\* \* \* \* \*